United States Patent
Arai (10) Patent No.: US 8,358,363 B2
(45) Date of Patent: Jan. 22, 2013

(54) VIDEO-PROCESSING APPARATUS, METHOD AND SYSTEM

(75) Inventor: Hiroshi Arai, Kanagawa (JP)

(73) Assignee: Sony Corporation, Tokyo (JP)

( * ) Notice: Subject to any disclaimer, the term of this patent is extended or adjusted under 35 U.S.C. 154(b) by 448 days.

(21) Appl. No.: 12/370,653

(22) Filed: Feb. 13, 2009

(65) Prior Publication Data

US 2009/0207310 A1  Aug. 20, 2009

(30) Foreign Application Priority Data

Feb. 15, 2008 (JP) ................................ P2008-035210

(51) Int. Cl.
  *H04N 5/228* (2006.01)
  *H04N 5/222* (2006.01)

(52) U.S. Cl. ................................ 348/333.01; 348/222.1

(58) Field of Classification Search ............. 348/240.99, 348/581, 222.1, 333.01–333.13
See application file for complete search history.

(56) References Cited

U.S. PATENT DOCUMENTS

| | | | | |
|---|---|---|---|---|
| 7,450,165 B2 * | 11/2008 | Ahiska | ....................... | 348/240.2 |
| 7,643,742 B2 * | 1/2010 | Watanabe et al. | ............... | 396/60 |
| 7,852,356 B2 * | 12/2010 | Takikawa et al. | ............. | 345/660 |
| 7,865,075 B2 * | 1/2011 | Watanabe | ...................... | 396/147 |
| 2005/0007478 A1 * | 1/2005 | Ahiska | .......................... | 348/335 |
| 2005/0251015 A1 * | 11/2005 | Takikawa et al. | ............. | 600/407 |

FOREIGN PATENT DOCUMENTS

| | | |
|---|---|---|
| JP | 11 205786 | 7/1999 |
| JP | 2002 314984 | 10/2002 |
| JP | 2003 18583 | 1/2003 |
| JP | 2003 163837 | 6/2003 |
| JP | 2003 274335 | 9/2003 |
| JP | 2005 316007 | 11/2005 |
| JP | 2006 115046 | 4/2006 |
| JP | 2006 129152 | 5/2006 |

* cited by examiner

*Primary Examiner* — Aung S Moe

(74) *Attorney, Agent, or Firm* — Frommer Lawrence & Haug LLP; William S. Frommer; Thomas F. Presson

(57) ABSTRACT

A video-processing apparatus contains a region-setting-processing unit that sets a plurality of zoom regions each enlarging a part of an input video image and displaying the enlarged part of the input video image and creates viewpoint information indicating the set zoom regions. The input video image has a higher resolution than a display resolution. The video-processing apparatus also contains a video-data-extracting unit that extracts video data from video data of the input video image for every set zoom region, a video-data-converting unit that downconverts the extracted video data to video data of the display resolution, and an output unit that outputs the downconverted video data and the viewpoint information with the viewpoint information corresponding to the downconverted video data.

12 Claims, 8 Drawing Sheets

VIDEO-PROCESSING APPARATUS, METHOD AND SYSTEM

CROSS REFERENCES TO RELATED APPLICATIONS

The present invention contains subject matter related to Japanese Patent Application JP 2008-035210 filed in the Japanese Patent Office on Feb. 15, 2008, the entire contents of which being incorporated herein by reference.

BACKGROUND OF THE INVENTION

1. Field of the Invention

The present invention relates to a video-processing apparatus, a video-processing method and a video-processing system. It particularly relates to a video-processing apparatus and the like which are able to obtain zoom video image with excellent image quality easily.

2. Description of Related Art

In a past image pickup apparatus, a high resolution of a still image has been developed owing to multipixel image pickup device. On the other hand, a video image has remained in less resolution than that of the still image in order to restrain an amount of information thereof. Consequently, a zoom video image which is obtained by enlarging a part of a picked-up image based on trimming or upconversion using video data of an image, namely, a video image obtained by executing digital zoom has been degraded in image quality.

Japanese Patent Application Publication No. 2003-18583 has proposed how to distribute video after processing an image picked-up from separate directions using a plurality of image pick-up apparatuses. Thus, in a case when using the plurality of image pick-up apparatuses, if any image pick-up apparatus generates a picked-up zoom-in image of a desired subject, it is possible to obtain a zoom video image with excellent image quality.

SUMMARY OF THE INVENTION

When, however, the plurality of image pick-up apparatuses is used, it is difficult to obtain a zoom video image with excellent image quality by a low cost configuration. Further, the plurality of image pick-up apparatuses is operated concurrently while they pick up a motion subject with them panning, so that it is difficult to conduct the image pickup control easily.

It is desirable to provide a video-processing apparatus, a video-processing method and a video-processing system, which are able to obtain a zoom video image with excellent image quality easily by a low cost configuration.

According to an embodiment of the present invention, there is provided a video-processing apparatus containing a region-setting-processing unit that sets a plurality of zoom regions each enlarging a part of input video image and displaying the enlarged part of the input video image, the input video image having a higher resolution than a display resolution, and creates viewpoint information indicating the set zoom regions. The video-processing apparatus also contains a video-data-extracting unit that extracts video data from video data of the input video image for every set zoom region, a video-data-converting unit that downconverts the extracted video data to video data of the display resolution, and an output unit that outputs the downconverted video data and the viewpoint information with the viewpoint information corresponding to the downconverted video data.

According to another embodiment of the present invention, there is provided a video-processing method containing a region-setting-processing step of setting a plurality of zoom regions each enlarging a part of input video image and displaying enlarged part of the input video image, the input video image having a higher resolution than a display resolution, and creating viewpoint information indicating the set zoom regions. The video-processing method also contains a video-data-extracting step of extracting video data from video data of the input video image for every set zoom region, a video-data-converting step of downconverting the extracted video data to video data of the display resolution, and an output step of outputting the downconverted video data and the viewpoint information with the viewpoint information corresponding to the downconverted video data.

In the embodiments of the video-processing apparatus and the video-processing method relating to the present invention, it is processed so that a plurality of zoom regions is set with respect to the input video image having a higher resolution than a display resolution, namely, a resolution of a display device displaying a video image, and the video data of each of the zoom regions is downconverted to video data of the display resolution and output. Further, the viewpoint information indicating the zoom regions, for example, information indicating zoom ratios or the like is output with it corresponding to the video data of the display resolution and when the zoom ratio or the like is specified based on the viewpoint information, it is possible to present a desired zoom video image with excellent image quality easily by selecting the video data corresponding to the specified zoom ratio or the like.

According to further embodiment of the present invention, there is provided a video-processing system containing a first video-processing apparatus that executes video processing on video data of an input video image, and a second video-processing apparatus that executes video processing using output data from the first video-processing apparatus to create video data of display video image. The first video-processing apparatus includes a region-setting-processing unit that sets a plurality of zoom regions each enlarging a part of the input video image and displaying the enlarged part of the input video image, the input video image having a higher resolution than a display resolution, and creates viewpoint information indicating the set zoom regions. The first video-processing apparatus also includes a video-data-extracting unit that extracts video data from video data of the input video image for every set zoom region, a video-data-converting unit that downconverts the extracted video data to video data of the display resolution, and an output unit that outputs the downconverted video data and the viewpoint information with the viewpoint information corresponding to the downconverted video data. The second video-processing apparatus includes a viewpoint-information-extracting unit that extracts the viewpoint information from the output data, a region-specifying unit that specifies a zoom region displaying the video image from the zoom regions indicated by the viewpoint information, a video-data-selecting unit that selects video data of the specified zoom region from the output video data, and a display-video-data-creating unit that creates the video data of the display image using the selected video data.

In the embodiment of the video-processing system relating to the present invention, a plurality of zoom regions is set with respect to the input video image having a higher resolution than the display resolution. For example, a plurality of zoom regions that are different from each other in zoom ratio or a plurality of zoom regions that are different from each other in zoom ratio while reference positions of the plurality of zoom regions are set to the same position is set. The viewpoint information indicating the set zoom regions is created. The video data of each of the zoom regions is extracted from video data of the input video image and the extracted video data is then downconverted to video data of the display resolution to be output. When outputting the downconverted video data, the viewpoint information is also outputted with the viewpoint information corresponding to the downconverted video data. Further, when outputting the downconverted video data, the video data is compressed and encoded, which allows an amount of data thereof to be decreased. When displaying the video image, a zoom region displaying the video image is specified from the zoom regions indicated by the viewpoint information, and the video data of the display image is created by selecting video data corresponding to the selected zoom region and using it.

Thus, according to the embodiments of the invention, a plurality of zoom regions is set with respect to the input video image and the video data of each of the zoom regions is downconverted to video data of the display resolution, which is output. The viewpoint information indicating the zoom regions is also output with it corresponding to the video data. When specifying the desired zoom region based on the viewpoint information, the video data of the display image is created by using the video data corresponding to this zoom region. Thus, by specifying the desired zoom region, it is possible to obtain a zoom video image with excellent image quality easily.

The concluding portion of this specification particularly points out and directly claims the subject matter of the present invention. However, those skilled in the art will best understand both the organization and method of operation of the invention, together with further advantages and objects thereof, by reading the remaining portions of the specification in view of the accompanying drawing(s) wherein like reference characters refer to like elements.

DESCRIPTION OF THE PREFERRED EMBODIMENTS

The following will describe embodiments of the invention with reference to drawings.

Figure 1:
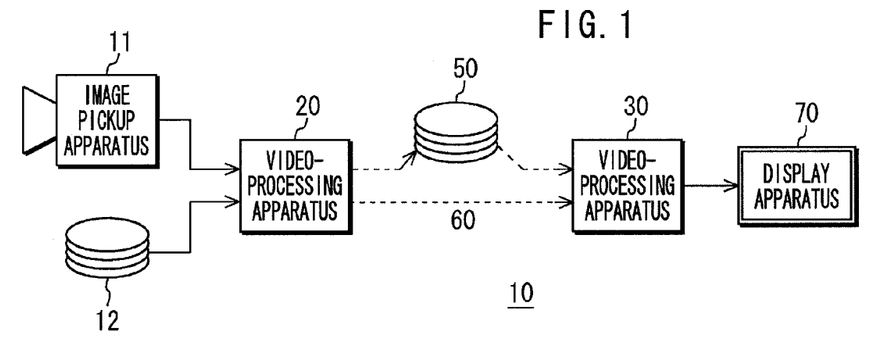
FIG. 1 is a diagram showing a configuration of a video-processing system as an embodiment of the invention.

FIG. 1 shows a configuration of a video-processing system as an embodiment of the invention. This video-processing system 10 contains a video-processing apparatus 20 of recording side and a video-processing apparatus 30 of reproducing side. The video-processing apparatus 20 creates video data of a plurality of zoom video images each having a display resolution from video data of video image, which has a higher resolution than the display resolution, created by an image pickup apparatus 11 or from video data of video image, which has a higher resolution than the video image, read out of a recording device 12. The video-processing apparatus 30 of reproducing side creates video data of display image from video data for every zoom video image created in the video-processing apparatus 20 by using desired video data and outputs the video data of the created display image to a display apparatus 70.

Here, the video data of a plurality of zoom video images created in the video-processing apparatus 20 of recording side is supplied to the video-processing apparatus 30 of reproducing side, for example, through a recording device 50, which includes recording medium. The video-processing apparatus 20 may compress and encode the video data and the video-processing apparatus 30 may decode the compressed and encoded video data so that the video data of the zoom video image can be efficiently supplied from the video-processing apparatus 20 to the video-processing apparatus 30.

Figure 2:
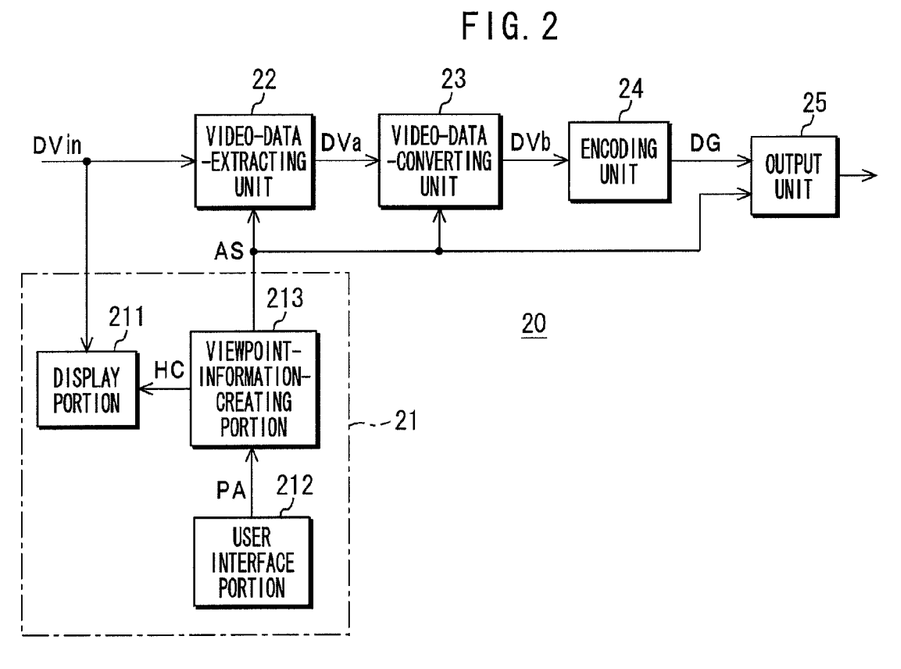
FIG. 2 is a diagram showing a configuration of a video-processing apparatus of recording side as another embodiment of the invention.

FIG. 2 shows a configuration of the video-processing apparatus 20 of recording side as another embodiment of the invention. A region-setting-processing unit 21 and a video-data-extracting unit 22 receive video data DVin from the image pickup apparatus 11 or the recording device 12. The video data DVin is video data of video image having a higher resolution than a display resolution of the zoom video image to be displayed on a display apparatus that is connected with the video-processing apparatus 30 of reproducing side.

The region-setting-processing unit 21 sets a plurality of the zoom regions each enlarging a part of input video image based on the video data DVin and displaying the enlarged part of the input video image. The region-setting-processing unit 21 also creates viewpoint information AS indicating the set zoom regions and supplies it to the video-data-extracting unit 22 and an output unit 25. The zoom regions may be set to fixed ratios or to user's desired ratios based on the input video image. The zoom regions are zoom regions that are different from each other in zoom ratio while having the same reference position, zoom regions that are different from each other in reference position while having the same zoom ratio, or zoom regions that are different from each other in the zoom ratio and the reference position. It is to be noted that when the zoom regions are set to fixed ratios, a viewpoint-information-creating portion 213 is assumed so as to hold the viewpoint information AS indicating each zoom region.

When the zoom regions are set according to user's operation, a graphical user interface (GUI) is constituted by, for example, a display portion 211 and the viewpoint-information-creating portion 213. The display portion 211 displays input video image based on the video data DVin and displays a cursor. A user interface portion 212 includes a mouse, a pointing device such as a touch panel, a keyboard or the like and generates an operation signal PA based on the user operation to supply it to the viewpoint-information-creating portion 213.

The viewpoint-information-creating portion 213 supplies a display control signal HC corresponding to the operation signal PA to the display portion 211 to allow the cursor moving based on the user operation to be displayed on a video image displayed on the display portion 211. The viewpointinformation-creating portion 213 also creates sets information indicating a position on a system of coordinates, which is indicated by the cursor, zoom ratio or the like as the viewpoint information AS when the operation signal PA indicates a determination operation of the zoom region, for example, a determination operation of a reference position in the zoom region or a determination operation of the zoom ratio.

The video-data-extracting unit 22 extracts video data of the zoom region indicated by the viewpoint information AS from the video data DVin for every zoom region and supplies the extracted video data DVa to a video-data-converting unit 23.

The video-data-converting unit 23 downconverts the video data DVa to convert it to video data DVb of the display resolution and supplies it to an encoding unit 24. In other words, the video-data-converting unit 23 performs a pixel conversion or a scanning line conversion on the video data DVa to generate the video data DVb having a pixel count or a scanning line count of a display video image.

The encoding unit 24 receives the video data DVb and encodes it to obtain a compressed and encoded data DG. The encoding unit 24 also supplies the encoded data DG obtained by encoding the video data DVb to the output unit 25.

The output unit 25 outputs the encoded data DG and the viewpoint information AS with the viewpoint information AS corresponding to the encoded data DG. For example, when zoom ratios of respective zoom regions are indicated in the viewpoint information AS, the output unit 25 outputs the encoded data DG and the viewpoint information AS with the viewpoint information AS corresponding to the encoded data DG so that by selecting the desired zoom ratio, the encoded data can be selected corresponding to the zoom region with the selected zoom ratio. Specifically, the encoded data DG and the viewpoint information AS are separately filed and the files of the encoded data DG and the viewpoint information AS are linked. When specifying the desired zoom region based on the viewpoint information AS, this allows the encoded data corresponding to the specified zoom region to be selected. Further, header information may be added to each of the items of the encoded data DG and the header information may include the viewpoint information AS, so that it is possible to acknowledge that the encoded data indicates a video image of any zoom region, which enables the encoded data corresponding to the desired zoom region to be selected based on the header information.

The video-processing apparatus 20 outputs the encoded data DG and the viewpoint information AS thus generated with the viewpoint information AS corresponding to the encoded data DG and for example, the recording device 50 records them. It is to be noted that the video-processing apparatus 20 may supply the encoded data DG and the viewpoint information AS to the video-processing apparatus 30 through a network 60 shown in FIG. 1 or the like.

Figure 3:
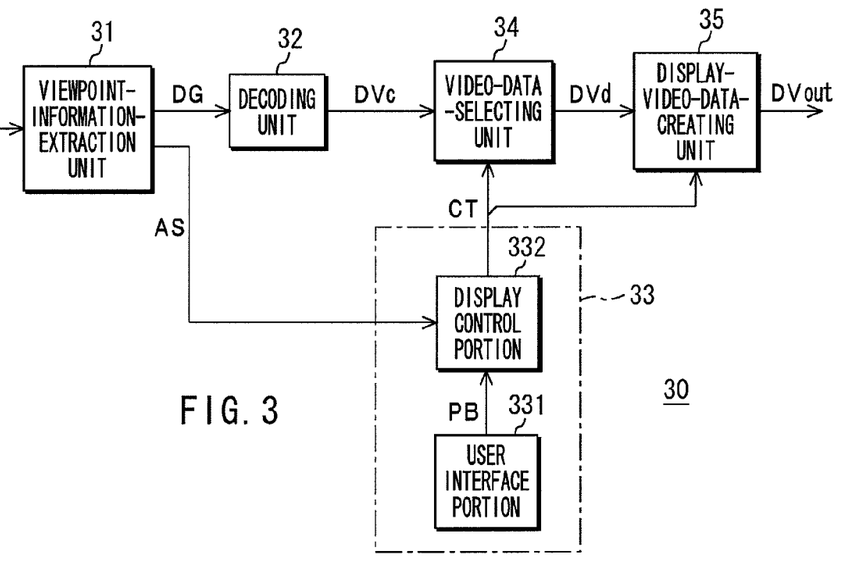
FIG. 3 is a diagram showing a configuration of a video-processing apparatus of reproducing side.

FIG. 3 shows a configuration of the video-processing apparatus 30 of reproducing side. A viewpoint-information-extracting unit 31 receives the encoded data DG and the viewpoint information AS from the recording device 50. It is to be noted that the viewpoint-information-extracting unit 31 also receives the encoded data DG and the viewpoint information AS from the video-processing apparatus 20 through a network or the like.

The viewpoint-information-extracting unit 31 extracts the viewpoint information AS corresponding to the encoded data DG and supplies it to a region-specifying unit 33. The viewpoint-information-extracting unit 31 also supplies the encoded data DG to a decoding unit 32.

The decoding unit 32 decodes the encoded data DG to obtain video data DVc and supplies the obtained video data DVc to a video-data-selecting unit 34.

The region-specifying unit 33 contains a user interface portion 331 and a display control portion 332. The user interface portion 331 includes a mouse, a pointing device such as a touch panel, a keyboard or the like and creates an operation signal PB based on the user operation to supply it to the display control portion 332.

The display control portion 332 determines which zoom region the user specifies based on the operation signal PB and creates a display control signal CT based on a determination result thereof to supply it to a video-data-selecting unit 34 and a display-video-data-creating unit 35.

When specifying the zoom region according to user's operation, a graphical user interface (GUI) is constituted by, for example, the region-specifying unit 33 and the display apparatus 70. The display control portion 332 displays pieces of information indicating the selectable zoom regions, for example, zoom ratios or the like by creating information display data based on the viewpoint information AS and supplying it to the display apparatus 70 through the display-video-data-creating unit 35. It is to be noted that the region-specifying unit 33 may be provided with a display unit, on which the selectable zoom ratios or the like are displayed.

When the display control portion 332 determines that the zoom region is specified based on the operation signal PB, the display control portion 332 stops the display control signal CT for displaying the zoom video image with the specified zoom ratio on the display apparatus 70.

The video-data-selecting unit 34 selects video data Dvd of one or plural zoom regions to be used for video displaying from the received video data DVc based on the display control signal CT and supplies the selected video data DVd to the display-video-data-creating unit 35.

The display-video-data-creating unit 35 receives items of the video data DVd from the video-data-selecting unit 34 and writes it into, for example, a frame buffer. The display-video-data-creating unit 35 successively reads the items of the written video data out of the frame buffer and converts their format into a format corresponding to the display apparatus 70 to then supply them to the display apparatus 70 as display video data DVout.

Figure 4:
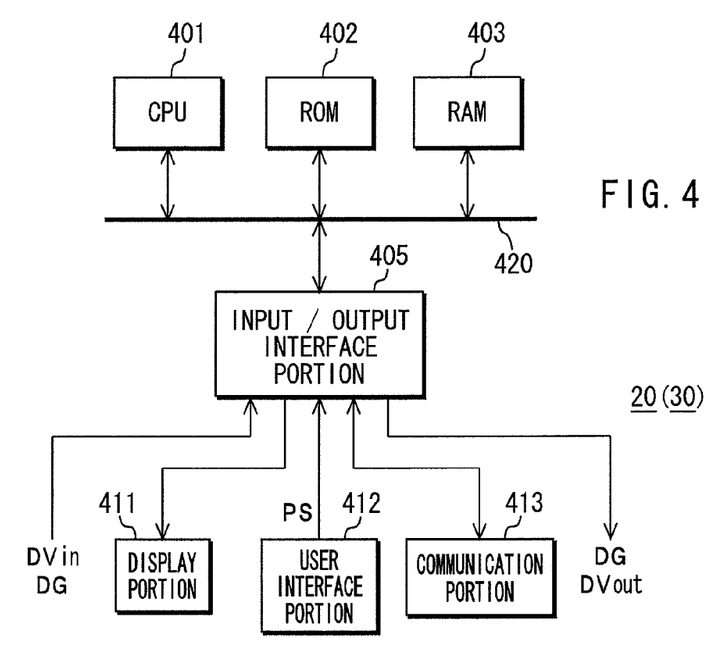
FIG. 4 is a diagram showing a configuration of a video-processing apparatus when executing video processing by software.

By the way, the video-processing apparatus 20 or 30 may be realized by not only hardware but also software. FIG. 4 shows a configuration of the video-processing apparatus 20 or 30 when it is realized by software.

Such a computer includes a central processing unit (CPU) 401 to which a read only memory (ROM) 402, a random access memory (RAM) 403, an input/output interface portion 405 are connected through a bus 420. To the input/output interface portion 405, a display portion 411, a user interface portion 412, a communication portion 413 are also connected.

The CPU 401 carries out any programs recorded in the ROM 402 and/or the RAM 403 to perform signal processing of the video data. Here, when generating video data of the plurality of zoom regions using the video data DVin of input video image, the CPU 401 performs various kinds of processing for extracting the video data of the zoom regions based on the viewpoint information AS from the video data DVin input from the input/output interface portion 405, for downconverting the extracted video data to that having the display resolution, for compressing and encoding the downconverted video data to generate the encoded data DG, for outputting the encoded data DG and the viewpoint information AS from the input/output interface portion 405 or the communication portion 413 with the viewpoint information AS corresponding to the encoded data DG, or the like. When generating the display video data DVout indicating zoom video image using the encoded data DG and the viewpoint information AS, the CPU 401 performs video processing using the encoded data DG and the viewpoint information AS received by the input/output interface portion 405 or the communication portion 413 to generate the display video data DVout indicating the zoom video image the user desires and output it to the display apparatus 70 from, for example, the input/output interface portion 405.

If the CPU 401 is a multi-core CPU, the CPU 401 performs processing for converting the video data of the plurality of zoom regions to the video data having the display resolution in parallel for every zoom region and processing for compressing and encoding the video data of the zoom regions in parallel for every zoom region. The CPU 401 also performs processing for decoding the encoded data in parallel for every zoom region.

It is to be noted that a recording medium may record any programs to be executed in the CPU 401, a recording medium drive may read the programs out of the recording medium, and the CPU 401 may carry out them. The communication portion 413 may communicate the programs through a transfer route. The CPU 401 may carry out the received programs.

Figure 5:
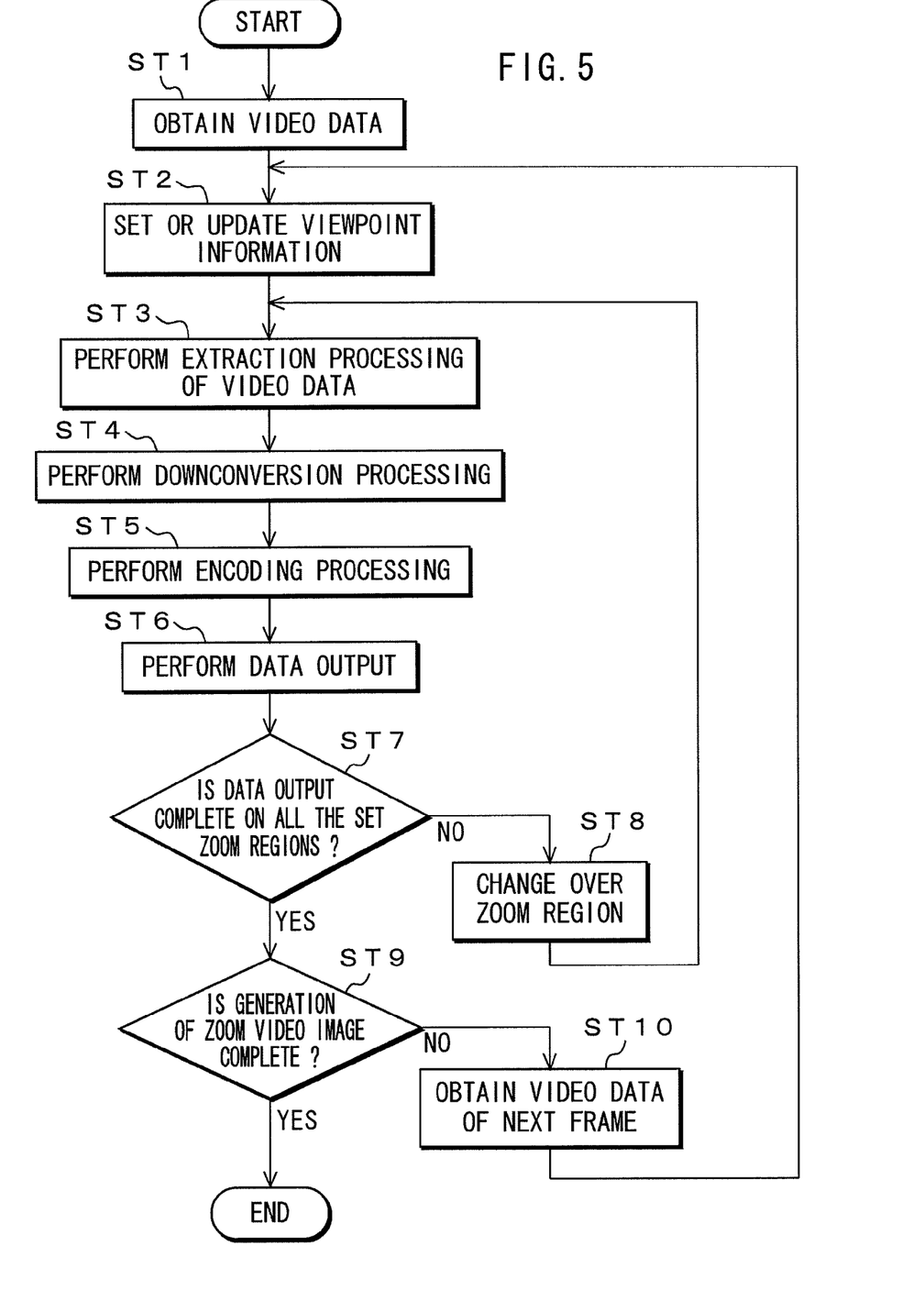
FIG. 5 is a flowchart showing processing of the video-processing apparatus of recording side.

FIG. 5 shows processing of the video-processing apparatus 20 of recording side. At step ST1, the CPU 401 of the video-processing apparatus 20 obtains the video data DVin of the input video image and the processing goes to step ST2. For example, the CPU 401 obtains the video data DVin of one frame of the input video image and the processing goes to the step ST2.

At the step ST2, the CPU 401 sets or updates the viewpoint information. The CPU 401 allows the input video image based on the video data DVin to be displayed on a screen of the display portion 411 and allows the cursor for setting, for example, the zoom region to be displayed on the input video image. The CPU 401 allows the cursor to be moved based on an operation signal PC from the user interface portion 412 and when setting the zoom region or updating the zoom region, it generates the viewpoint information AS indicating the set zoom region or the updated zoom region. The processing then goes to step ST3. On setting or updating the zoom region, for example, a rectangular-shaped cursor indicating a scope of, for example, the zoom region is provided, which enables a position and/or a size of the cursor to be adjusted. The CPU 401 determines the scope indicated by the cursor as the zoom region when a region-determination-operation is performed and generates the viewpoint information AS therefor. The cursor may indicate a reference position of the zoom region. In this case, a zoom ratio is set beforehand or a zoom ratio is set according to the user operation, and when determining the reference position, a zoom region having a predetermined zoom ratio is determined with the position indicated by the cursor being the reference and the viewpoint information AS is generated. The viewpoint information AS may be set or updated using another method.

At the step ST3, the CPU 401 performs extraction processing on the video data. The CPU 401 extracts the video data of one zoom region from the video data DVin and the processing goes to step ST4.

At the step ST4, the CPU 401 performs downconversion processing. The CPU 401 downconverts the video data of the extracted zoom region to the video data of display resolution. The processing then goes to step ST5.

At the step ST5, the CPU 401 performs encoding processing. The CPU 401 performs the compression and encoding using the downconverted video data to generate the encoded data.

At step ST6, the CPU 401 performs data output. The CPU 401 outputs to, for example, the recording device 50 the encoded data thus generated and the viewpoint information with the viewpoint information corresponding to the encoded data. The processing then goes to step ST7.

At the step ST7, the CPU 401 determines whether or not the data output is complete on all the set zoom regions. The processing goes to step ST8 if a zoom region on which the data output is not complete remains or the processing goes to step ST9 if the data output is complete on all the zoom regions.

At the step ST8, the CPU 401 changes over the zoom region to select one zoom region from the zoom regions on which the data output is not complete and the processing then goes back to the step ST3.

At the step ST9, the CPU 401 determines whether or not generation of the zoom video image is complete. The processing goes to step ST10 if the CPU 401 determines that the operation signal PC does not indicate a completion operation of the generation of the zoom video image or the processing finishes generation of the zoom video image if the CPU 401 determines that the operation signal PC indicates the completion operation of the generation of the zoom video image or the video data DVin finishes.

At the step ST10, the CPU 401 obtains video data of a next frame and the processing goes back to the step ST2.

Although items of the video data of display resolution have been successively generated for every zoom region in the flowchart shown in FIG. 5, it is possible to generate the video data of the display resolution in parallel using the multi-core CPU.

Figure 6:
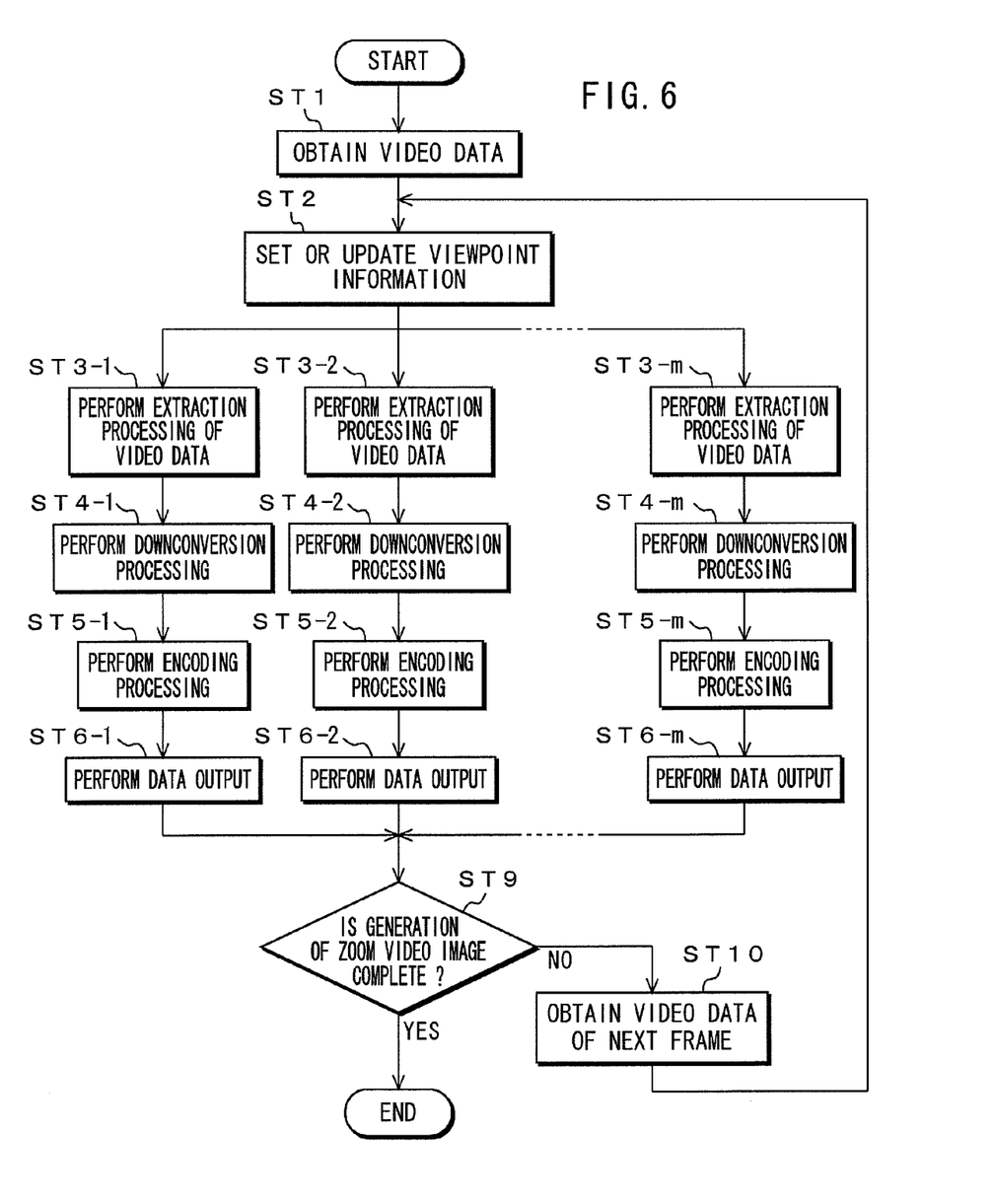
FIG. 6 is a flowchart in a case where video data of a display resolution is created in parallel.

FIG. 6 shows a flowchart in a case where video data of display resolution is generated in parallel. It is to be noted that FIG. 6 shows processing in a case where "m" pieces of the zoom regions are set. Further, in FIG. 6, like processing that corresponds to that shown in FIG. 5 is indicated by the like reference number shown in FIG. 5.

At step ST2, the CPU 401 sets or updates the viewpoint information and generates the viewpoint information AS indicating the set zoom region. The processing then goes to steps ST3-1 through ST 3-$m$. Alternatively, the CPU 401 updates the viewpoint information AS so as to indicate a new zoom region when the zoom region alters.

At the step ST3-1, the CPU 401 performs extraction processing of the video data. The CPU 401 extracts the video data of one zoom region from the video data DVin and the processing goes to step ST4-1. Further, the CPU 401 also extracts items of the video data at steps ST3-2 through ST3-$m$, which is similar to the step ST3-1, so as to extract items of the video data of different zoom regions in the respective steps.

At the step ST4-1, the CPU 401 performs downconversion processing. The CPU 401 downconverts the video data of the extracted zoom region to the video data of display resolution and the processing goes to step ST5-1. Further, at the steps ST4-2 through ST4-$m$, the CPU 401 performs downconversion processing, which is similar to the step ST4-1.

At the step ST5-1, the CPU 401 performs encoding processing. The CPU 401 performs the compression and encoding using the downconverted video data to generate the encoded data. Further, at the steps ST5-2 through ST5-$m$, the CPU 401 performs the encoding processing, which is similar to the step ST5-1.

At the step ST6-1, the CPU 401 performs data output. The CPU 401 outputs to, for example, the recording device 50 the encoded data thus generated and the viewpoint information with the viewpoint information corresponding to the encoded data. The processing then goes to step ST9. Further, at the steps ST6-2 through ST6-*m*, the CPU 401 performs the data output, which is similar to the step ST5-1.

Thus, carrying out the processing for compressing and encoding the video data of display resolution for every zoom region and outputting it in parallel allows an video image of plural zoom regions to be recorded in, for example, the recording device 50 rapidly and efficiently.

Figure 7:
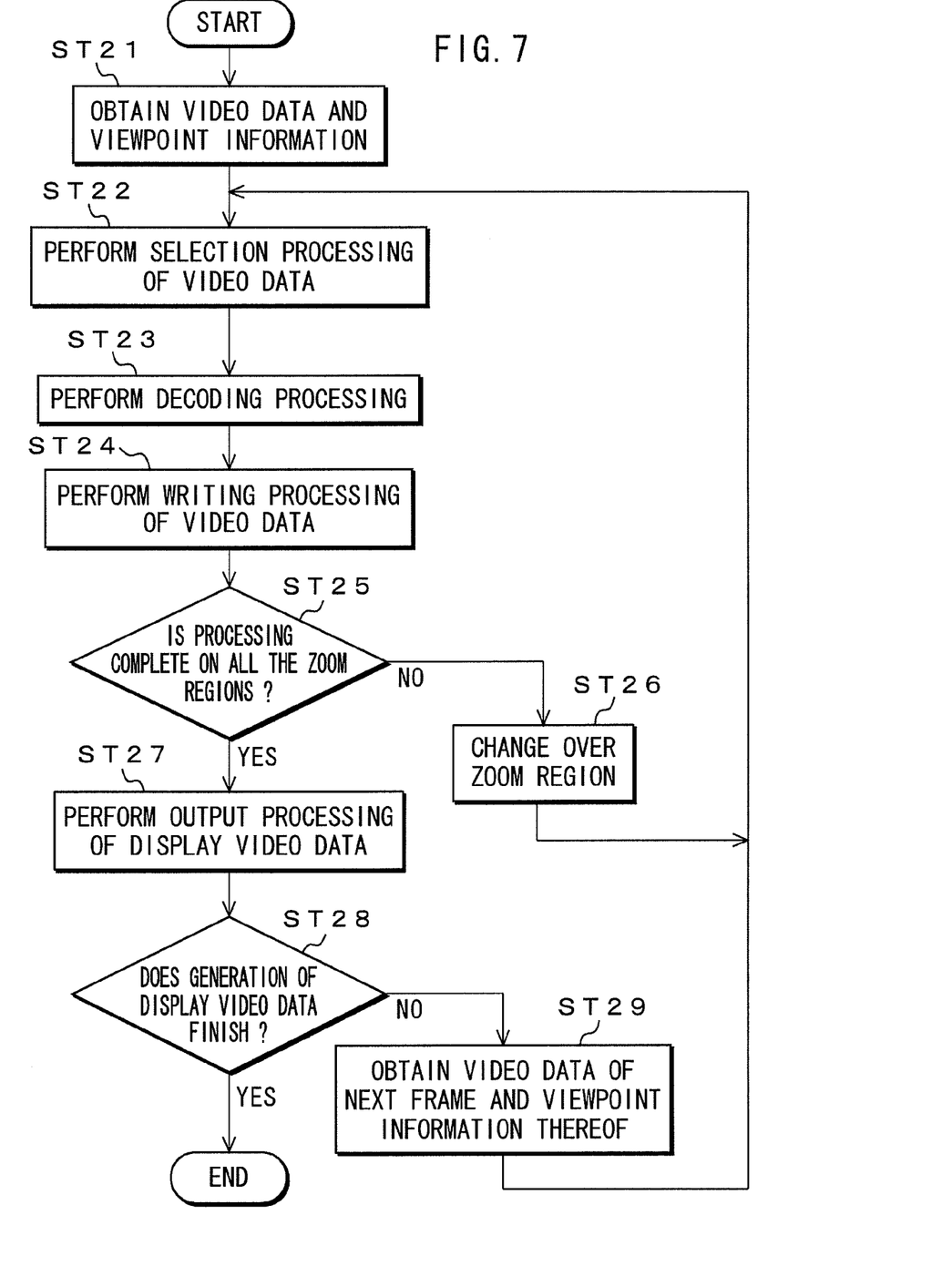
FIG. 7 is a flowchart showing processing of the video-processing apparatus of reproducing side.

The following will describe processing of the video-processing apparatus 30 of reproducing side with respect to a flowchart shown in FIG. 7. At step ST21, the CPU 401 of the video-processing apparatus 30 obtains the video data and the viewpoint information. The CPU 401 reads the video data and the viewpoint information out of the recording device 50 and the processing goes to step ST22.

At the step ST22, the CPU 401 performs selection processing of the video data. The CPU 401 selects encoded data of one zoom region and the processing goes to step ST23.

At the step ST23, the CPU 401 performs decoding processing. The CPU 401 decodes the encoded data selected at the step ST22 and/or performs data decompression thereof and the processing goes to step ST24.

At the step ST24, the CPU 401 performs writing processing of the video data. The CPU 401 writes the video data obtained by the decoding processing at the step ST23 into a memory unit (for example, the RAM 403) and the processing goes to step ST25.

At the step ST25, the CPU 401 determines whether or not the processing is complete on all the zoom regions. If the CPU 401 determines that the processing of writing the video data indicating the video image of the zoom region into the memory unit is complete on all the zoom regions, the processing goes to step ST27. If the CPU 401 determines that the zoom region on which the decoding processing has not yet performed remains, the processing goes to step ST26.

At the step ST26, the CPU 401 changes over the zoom region to select the video data of the zoom region on which the decoding processing has not yet performed and the processing goes back to the step ST22.

At the step ST27, the CPU 401 performs output processing of the display video data. The CPU 401 informs a user which zoom region is available for his or her selection based on the viewpoint information AS and reads items of the video data of one or plural zoom regions that are selected by the user so as to be video-displayed out of the memory unit to write them into a frame buffer. It is to be noted that when plural zoom regions are selected and displayed on one screen, any scale-down processing of images to be displayed or any control of writing position of the video data into the frame buffer is carried out depending on a layout of the zoom region(s) to be displayed. Further, the CPU 401 reads items of the video data written into the frame buffer in turn out of the frame buffer and outputs them from, for example, the input/output interface portion 405 as the display video data DVout with a format corresponding to the display apparatus 70.

At step ST28, the CPU 401 determines whether or not the output of the display video data finishes. If the CPU 401 determines that the operation signal PC does not indicate a finishing operation of the output of the display video data, the processing goes to step ST29. If the CPU 401 determines that the operation signal PC indicates the finishing operation of the output of the display video data or the encoded data DG finishes, the processing finishes.

At the step ST29, the CPU 401 obtains the video data of a next frame and the viewpoint information thereof and the processing goes back to the step ST22.

Although the selection of the video data and the decoding processing have been successively carried out for every zoom region in the flowchart shown in FIG. 7, it is possible to carry out the selection of the video data and the decoding processing in parallel using the multi-core CPU.

Figure 8:
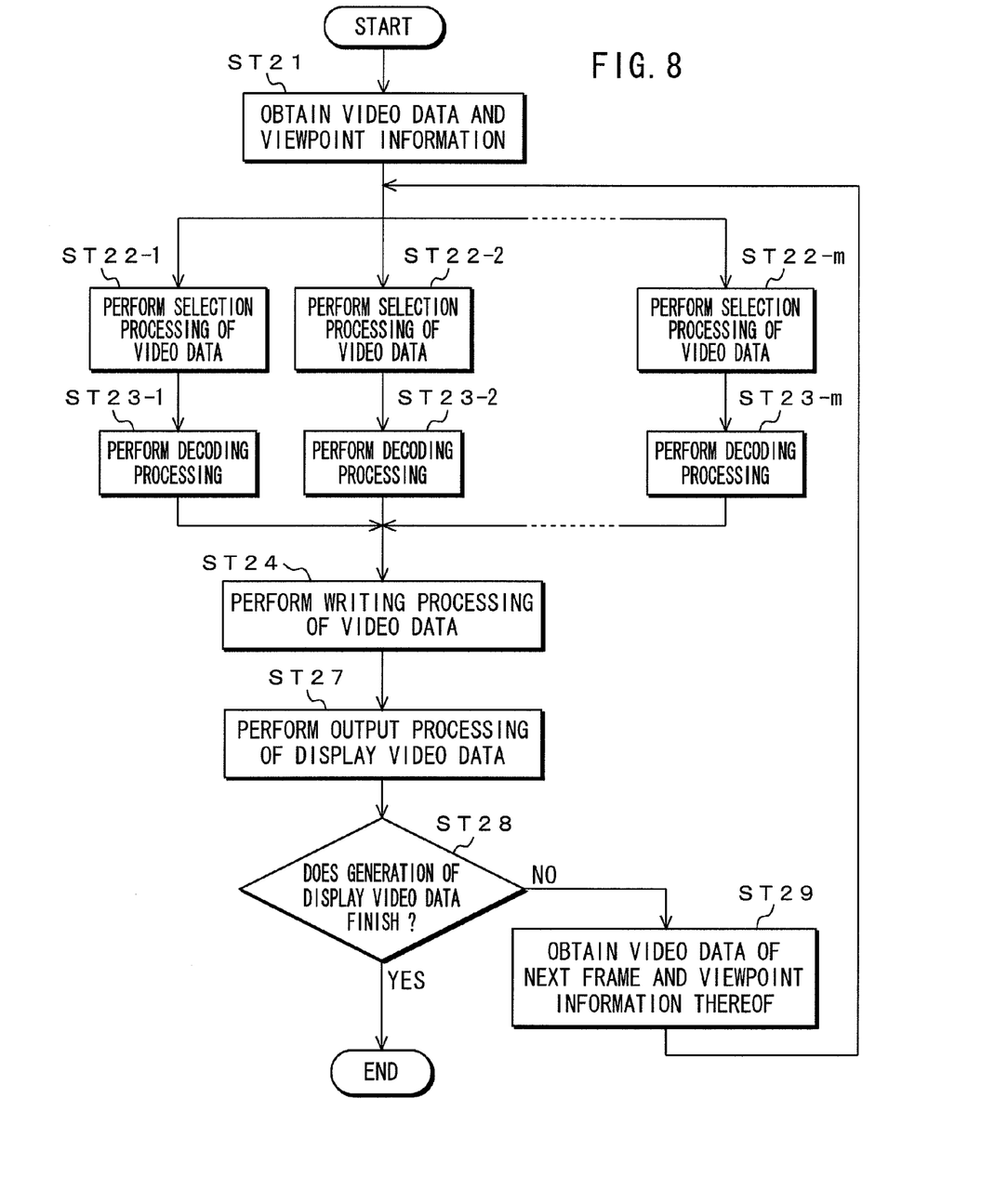
FIG. 8 is a flowchart in a case where selection of video data and decoding are executed in parallel.

FIG. 8 shows a flowchart in a case where the selection of the video data and the decoding processing are carried out in parallel. It is to be noted that in FIG. 8, like processing that corresponds to that shown in FIG. 7 is indicated by the like reference number shown in FIG. 7.

At step ST22-1, the CPU 401 performs selection processing of the video data. The CPU 401 selects encoded data of one zoom region and the processing goes to step ST23-1. At steps ST22-2 through ST22-*m*, the CPU 401 also performs the selection processing of the video data, which is similar to the step ST22-1, to select items of the video data of different zoom regions, respectively.

At the step ST23-1, the CPU 401 performs decoding processing. The CPU 401 performs the decoding processing on the encoded data selected at the step ST22-1 and the processing goes to step ST24. At steps ST23-2 through ST23-*m*, the CPU 401 also performs the decoding processing, which is similar to the step ST23-1.

At step ST24, the CPU 401 performs writing processing of the video data. The CPU 401 writes items of the video data obtained by the decoding processing at the steps ST23-1 through ST23-*m* into the memory unit.

At step ST27, the CPU 401 performs data output processing of the display video image. The CPU 401 reads items of the video data of one or plural zoom regions that are selected by the user so as to be video-displayed out of the memory unit to write them into a frame buffer. Further, the CPU 401 reads the items of the video data written into the frame buffer in turn out of the frame buffer and outputs them as the display video data DVout with a format corresponding to the display apparatus 70 from the input/output interface portion 405.

Thus, the video data obtained by decoding the encoded data of each zoom region is written into the memory unit so that change-over of the zoom video images to be displayed can be realized by only reading video signals out of the memory unit and changing over the video signals to be written into the frame buffer, which enables change-over of the zoom video images to be rapidly done without any delay.

Although it has been described in cases shown in FIGS. 3, 7 and 8 that the video data of zoom region to be displayed is selected after the encoded data has been decoded in the video-processing apparatus 30 of reproducing side, the encoded data may be decoded after the video data of zoom region to be displayed has been selected. In this case, it is not necessary to decode all the items of encoded data, which enables a load on the reproducing processing to be made light.

Figure 9A:
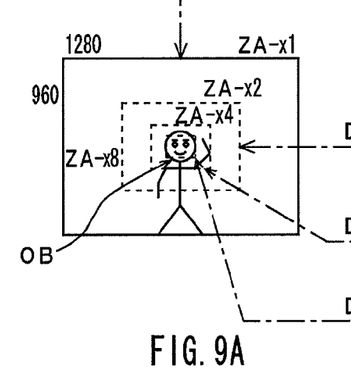
FIGS. 9A through 9D are diagrams each showing an operation of the video-processing apparatus of recording side.

The following will describe an operation of the video-processing apparatus 20 of recording side with reference to FIGS. 9A through 9D. The video-processing apparatus 20 sets zoom region(s) with respect to the input video image and it creates the viewpoint information AS indicating the set zoom region(s). FIG. 9A shows the input video image based on the video data DVin. Zoom regions ZA-x2, ZA-x4, ZA-x8 set with a subject OB being set to a reference position thereof are indicated by broken lines in FIG. 9A. It is to be noted that the whole input video image is a region with a reference zoom ratio of 1:1, so that the whole input video image is set to a zoom region ZA-x1. Further, it is assumed in the following description that the input video image has an image size of 1280 pixels by 960 lines and a display resolution of 320 pixels by 240 lines. In FIGS. 9A through 10B, each screen displays a video image of one frame as illustration.

The Zoom region ZA-x2 is a region of the zoom video image having a zoom ratio which is twice as large as the input video image with the subject OB being set to a reference position thereof. This zoom region ZA-x2 is a region of 640 pixels by 480 lines, which is obtained by multiplying the input video image by a half (½) in a horizontal direction and a vertical direction, respectively. In other words, if the region of 640 pixels by 480 lines is displayed with the display resolution of 320 pixels by 240 lines, an image is enlarged by twice and displayed as large as a case where the input video image having the image size of 1280 pixels by 960 lines is displayed with the display resolution of 320 pixels by 240 lines, which results in a double zoom ratio.

The Zoom region ZA-x4 is a region of the zoom video image having a zoom ratio which is quadruple as large as the input video image with the reference position thereof being equal to that of the zoom region ZA-x2. This zoom region ZA-x4 is a region of 320 pixels by 240 lines, which is obtained by multiplying the input video image by a quarter (¼) in a horizontal direction and a vertical direction, respectively.

The Zoom region ZA-x8 is a region of the zoom video image having a zoom ratio which is eight times as large as the input video image with the reference position thereof being equal to that of the zoom region ZA-x2. This zoom region ZA-x8 is a region of 160 pixels by 120 lines, which is obtained by multiplying the input video image by one eighth (⅛) in a horizontal direction and a vertical direction, respectively.

Figure 9B:
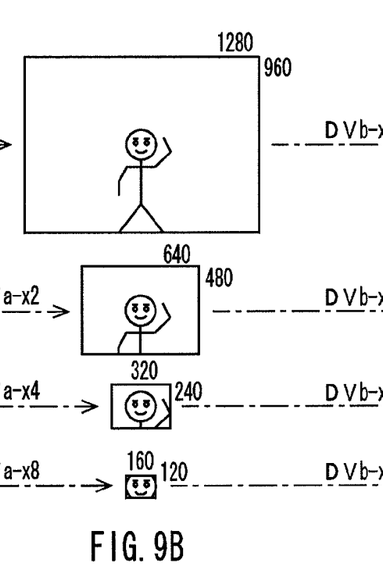

The video-processing apparatus 20 extracts the video data so as to extract items of video data DVa-x1, DVa-x2, DVa-x4, and DVa-x8 of the set zoom regions ZA-x1, ZA-x2, ZA-x4, and ZA-x8 from the video data DVin of the input video image. FIG. 9B shows the video images based on items of the extracted video data DVa-x1, DVa-x2, DVa-x4, and DVa-x8 of the zoom regions ZA-x1, ZA-x2, ZA-x4, and ZA-x8.

Figure 9C:
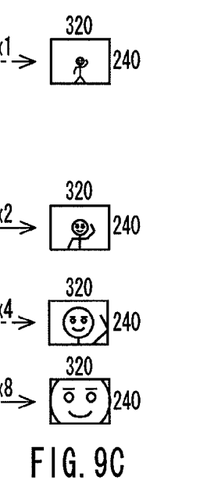

The video-processing apparatus 20 then performs data conversion on the video data to convert the video data DVa indicating the video image of each zoom region to the video data of display resolution. Specifically, if the display resolution is set to, for example, 320 pixels by 240 lines, the video data DVa-x1 indicating the video image of the zoom region ZA-x1 and the video data DVa-x2 indicating the video image of the zoom region ZA-x2 are downconverted so as to generate the items of the video data DVb-x1 and DVb-x2. Since the video image of the zoom region ZA-x8 has a less resolution than the display resolution, the video data DVa-x8 indicating the video image of the zoom region ZA-x8 is upconverted so as to generate the video data DVb-x8. It is to be noted that since the video image of the zoom region ZA-x4 has a resolution that is equal to the display resolution, the video data DVa-x4 indicating the video image of the zoom region ZA-x4 is unnecessary to be downconverted or upconverted so that the video data DVa-x4 becomes the video data DVb-x4. FIG. 9C shows video images based on the data-converted video data DVb-x1, DVb-x2, DVb-x4, and DVb-x8.

The video-processing apparatus 20 then performs the encoding processing on the video data DVb-x1, DVb-x2, DVb-x4, and DVb-x8 to generate items of the encoded data. Further, when the recording device 50 receives the encoded data and records the video images of the zoom regions ZA-x1, ZA-x2, ZA-x4, and ZA-x8, the video-processing apparatus 20 reads the video images recorded in the recording device 50 out of the recording device 50 and supplies them to the recording device 50 with the viewpoint information AS which indicates the zoom regions corresponding to items of the encoded data DG in order to easily select the video image(s) of the desired zoom region(s).

Figure 9D:
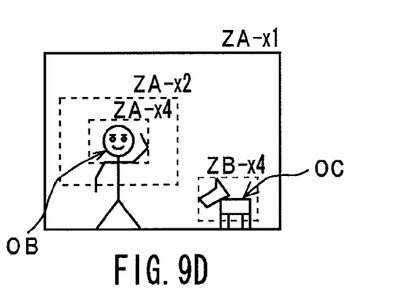

It is to be noted that although a plurality of zoom regions has been set in a state where the reference positions of the zoom regions are set to the same position with the zoom ratios being changed by stages in a case shown in FIG. 9A, a plurality of zoom regions may be set in a state where the reference positions of the zoom regions are set to the separate positions. For example, as shown in FIG. 9D, in addition to the zoom region ZA-x1 and the zoom regions ZA-x2 and ZA-x4 with the subject OB being set to a reference position thereof, a zoom region ZB-x4 may be set with another subject OC being set to a reference position thereof.

Figure 10A:
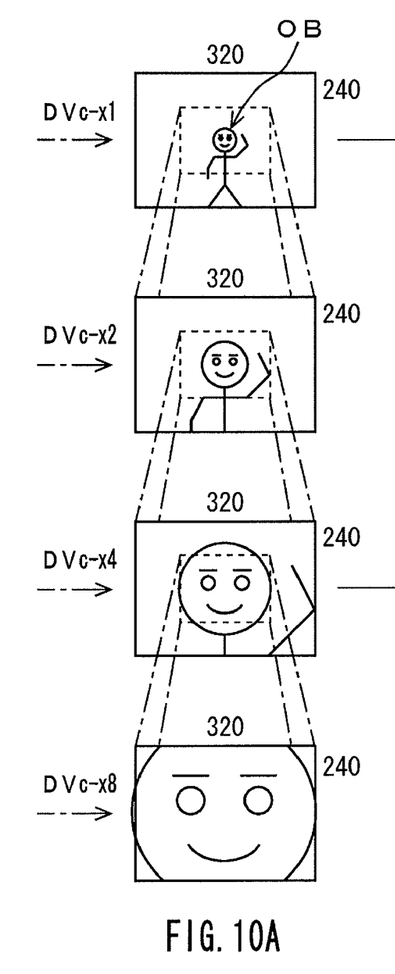
FIGS. 10A through 10C are diagrams each showing an operation of the video-processing apparatus of reproducing side.
Figure 10B:
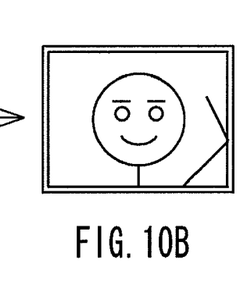
Figure 10C:
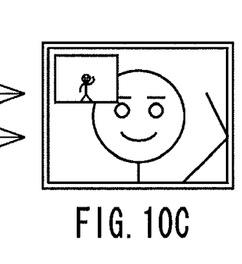

The following will describe an operation of the video-processing apparatus 30 of reproducing side with reference to FIGS. 10A through 10C. The video-processing apparatus 30 reads the encoded data and the viewpoint information AS out of the recording device 50. The video-processing apparatus 30 then performs the decoding processing on the read-out encoded data. Here, if the recording device 50 records the video images of the zoom regions ZA-x1, ZA-x2, ZA-x4, and ZA-x8 shown in FIG. 9A, the video-processing apparatus 30 reads the encoded data of the video image of the zoom region ZA-x1 and decodes it to generate the video data DVc-x1. In the same way, the video-processing apparatus 30 reads items of the encoded data of the video images of the zoom regions ZA-x2, ZA-x4, and ZA-x8 and decodes them to generate items of the video data DVc-x2, DVC-x4, and DVc-x8. FIG. 10A shows the video images based on the items of the video data DVc-x1, DVc-x2, DVc-x4, and DVc-x8, which are generated by the decoding processing.

The video-processing apparatus 30 informs a user which zoom region is available for his or her selection based on the viewpoint information and generates the display video data from the video data of the user's specified zoom region(s) to supply it to the display apparatus 70.

For example, if the user specifies the zoom region ZA-x4, the video-processing apparatus 30 generates the display video data using the video data DVc-x4 indicating the video image of the zoom region ZA-x4. At this time, as shown in FIG. 10B, the video image having a zoom ration that is quadruple as large as the input video image is displayed on a screen of the display apparatus 70. Since the video data DVc-x4 is not upconverted, it is possible to display the video image having a zoom ration, which is quadruple as large as the input video image, with excellent image quality.

If the user specifies the zoom regions ZA-x1 and ZA-x4, the video-processing apparatus 30 generates items of the display video data using items of the video data DVc-x1 and DVc-x4 indicating the video images of the zoom regions ZA-x1 and ZA-x4. At this time, as shown in FIG. 10C, the input video image and the video image having a zoom ration that is quadruple as large as the input video image are displayed on a screen of the display apparatus 70. It is to be noted that FIG. 10C illustrates the display video images while the video image of the zoom region ZA-x4 is displayed on a main screen and the input video image is displayed on a picture-in-picture screen. It is to be noted that in this case, the video-processing apparatus 30 performs downconversion on the input video image of the zoom region Za-x1 to that having a size of the picture-in-picture screen.

If the user specifies the zoom regions ZA-x1, ZA-x2, and ZA-x4 in turn, the video-processing apparatus 30 changes over items of the video data using when generating the display video images in order of items of the video data DVc-x1, DVc-x2, and DVc-x4. Here, the reference positions of the zoom regions ZA-x2 and ZA-x4 are set to the same position, it is possible to display the subject OB having excellent image quality on a screen of the display apparatus 70 with the subject OB being enlarged in turn.

If the user specifies the zoom region ZA-x8 obtained by performing upconversion processing thereon as past technology, it is possible to display a zoom video image with a high zoom ratio which, however, has less image quality. If the zoom regions in which the reference positions thereof are separated can be selected, it is possible to display a zoom video image of a desired subject with excellent image quality.

Although the video data of the user's specified zoom region has been selected from the video data DVc-x1, DVC-x2, DVc-x4, and DVc-x8 obtained by performing the decoding processing to generate the display video data in a case shown in FIGS. 10A through 10C, the encoded data of the user's specified zoom region may be selected to generate the display video data from the video data obtained by performing the decoding processing on the encoded data thus selected.

Thus, according to the embodiments of the video-processing apparatuses of the invention, a plurality of zoom regions is set with respect to the input video image having a higher resolution than a display resolution and the video data is extracted from the video data of the input video image for every zoom region. Further, the extracted video data is downconverted so as to be converted to the video data with the display resolution. The viewpoint information indicating the set plural zoom regions is created and output with the viewpoint information corresponding to the video data of the display resolution. Thus, when, for example, the selectable zoom regions are informed to the user based on the viewpoint information and the user specifies the zoom region(s), it is possible to display the video image(s) of the zoom region(s) with excellent image quality using the video data corresponding to the specified zoom region(s).

Although it has been described in the above-mentioned embodiments that the video-processing apparatus of recording side is separated from the image pickup apparatus, the video-processing apparatus of recording side may be built in the image pickup apparatus and the zoom region(s) may be set when recording the picked-up video image.

It should be understood by those skilled in the art that various modifications, combinations, sub-combinations and alterations may occur depending on design requirements and other factors insofar as they are within the scope of the appended claims or the equivalents thereof.

What is claimed is:

1. A video-processing apparatus comprising:
    a region-setting-processing unit that sets a plurality of zoom regions each enlarging a part of an input video image and displaying the enlarged part of the input video image, the input video image having a higher resolution than a display resolution, and creates viewpoint information indicating the set zoom regions;
    a video-data-extracting unit that extracts video data from video data of the input video image for every set zoom region;
    a video-data-converting unit that downconverts the extracted video data to video data of the display resolution; and
    an output unit that outputs the downconverted video data and the viewpoint information with the viewpoint information corresponding to the downconverted video data,
    wherein the viewpoint information includes information indicating a plurality of zoom ratios associated with zoom regions having the same reference position and is output to a file that is separate from but linked with the video data and allows a selection of zoom regions based on a zoom ratio included in the viewpoint information, and
    wherein upon a reproduction of the input video image, selectable zoom regions and corresponding zoom ratios included in the input video image are displayed based on the viewpoint information to a user to choose a selectable zoom region.

2. The video-processing apparatus according to claim 1, wherein the region-setting-processing unit sets a plurality of zoom regions that are different from each other in zoom ratio.

3. The video-processing apparatus according to claim 2, wherein the region-setting-processing unit sets the plurality of zoom regions while reference positions of the plurality of zoom regions are set to the same position.

4. The video-processing apparatus according to claim 1, further comprising an encoding unit that compresses and encodes the downconverted video data,
    wherein the output unit outputs the compressed and encoded video data and the viewpoint information with the viewpoint information corresponding to the compressed and encoded video data.

5. A video-processing method comprising:
    a region-setting-processing step of setting a plurality of zoom regions each enlarging a part of input video image and displaying enlarged part of the input video image, the input video image having a higher resolution than a display resolution, and creating viewpoint information indicating the set zoom regions;
    a video-data-extracting step of extracting video data from video data of the input video image for every set zoom region;
    a video-data-converting step of downconverting the extracted video data to video data of the display resolution; and
    an output step of outputting the downconverted video data and the viewpoint information with the viewpoint information corresponding to the downconverted video data,
    wherein the viewpoint information includes information indicating a plurality of zoom ratios associated with zoom regions having the same reference position and is output to a file that is separate from but linked with the video data and allows a selection of zoom regions based on a zoom ratio included in the viewpoint information, and
    wherein upon a reproduction of the input video image, selectable zoom regions and corresponding zoom ratios included in the input video image are displayed based on the viewpoint information to a user to choose a selectable zoom region.

6. The video-processing method according to claim 5, wherein the region-setting-processing step sets a plurality of zoom regions that are different from each other in zoom ratio.

7. The video-processing method according to claim 6, wherein the region-setting-processing step sets the plurality of zoom regions while reference positions of the plurality of zoom regions are set to the same position.

8. The video-processing method according to claim 5, further comprising an encoding step of compressing and encoding the downconverted video data,
    wherein the output step outputs the compressed and encoded video data and the viewpoint information with the viewpoint information corresponding to the compressed and encoded video data.

9. A video-processing system comprising:
a first video-processing apparatus that executes video processing on video data of an input video image; and
a second video-processing apparatus that executes video processing using output data from the first video-processing apparatus to create video data of display video image,
wherein the first video-processing apparatus includes:
- a region-setting-processing unit that sets a plurality of zoom regions each enlarging a part of the input video image and displaying the enlarged part of the input video image, the input video image having a higher resolution than a display resolution, and creates viewpoint information indicating the set zoom regions;
- a video-data-extracting unit that extracts video data from video data of the input video image for every set zoom region;
- a video-data-converting unit that downconverts the extracted video data to video data of the display resolution; and
- an output unit that outputs the downconverted video data and the viewpoint information with the viewpoint information corresponding to the downconverted video data, and wherein the second video-processing apparatus includes:
- a viewpoint-information-extracting unit that extracts the viewpoint information from the output data;
- a region-specifying unit that specifies a zoom region displaying the video image from the zoom regions indicated by the viewpoint information;
- a video-data-selecting unit that selects video data of the specified zoom region from the output video data; and
- a display-video-data-creating unit that creates the video data of the display image using the selected video data, wherein the viewpoint information includes information indicating a plurality of zoom ratios associated with zoom regions having the same reference position and is output to a file that is separate from but linked with the video data and allows a selection of zoom regions based on a zoom ratio included in the viewpoint information, and wherein upon a reproduction of the input video image, selectable zoom regions and corresponding zoom ratios included in the input video image are displayed based on the viewpoint information to a user to choose a selectable zoom region.

10. The video-processing system according to claim 9, wherein the region-setting-processing unit sets a plurality of zoom regions that are different from each other in zoom ratio.

11. The video-processing system according to claim 10, wherein the region-setting-processing unit sets the plurality of zoom regions while reference positions of the plurality of zoom regions are set to the same position.

12. The video-processing system according to claim 9, further comprising an encoding unit that compresses and encodes the downconverted video data,
wherein the output unit outputs the compressed and encoded video data and the viewpoint information with the viewpoint information corresponding to the compressed and encoded video data.

* * * * *